United States Patent
Huttner et al.

(10) Patent No.: US 8,528,719 B2
(45) Date of Patent: Sep. 10, 2013

(54) CONVEYOR SYSTEM

(75) Inventors: Johann Huttner, Mallersdorf-Pfaffenberg (DE); Martin Seger, Neumark (DE)

(73) Assignee: KRONES AG, Neutraubling (DE)

(*) Notice: Subject to any disclaimer, the term of this patent is extended or adjusted under 35 U.S.C. 154(b) by 125 days.

(21) Appl. No.: 13/227,531

(22) Filed: Sep. 8, 2011

(65) Prior Publication Data

US 2012/0055758 A1    Mar. 8, 2012

(30) Foreign Application Priority Data

Sep. 8, 2010  (DE) .......................... 10 2010 040 410
Sep. 8, 2010  (DE) .......................... 10 2010 040 413

(51) Int. Cl.
B65G 37/00    (2006.01)

(52) U.S. Cl.
USPC ........................ 198/347.1; 198/594

(58) Field of Classification Search
USPC ................. 198/347.1, 347.2, 594, 812, 831
See application file for complete search history.

(56) References Cited

U.S. PATENT DOCUMENTS

| | | | |
|---|---|---|---|
| 4,054,202 A | | 10/1977 | Hautemont |
| 6,698,581 B2 * | | 3/2004 | Steeber et al. ............... 198/602 |
| 6,793,062 B2 * | | 9/2004 | Hammock et al. .......... 198/347.1 |
| 6,817,464 B2 * | | 11/2004 | Biondi et al. ............... 198/347.1 |
| 7,191,896 B2 * | | 3/2007 | Hartness et al. ............. 198/594 |
| 7,219,788 B2 * | | 5/2007 | Tuck et al. .................. 198/347.2 |
| 7,926,642 B2 * | | 4/2011 | Huttner et al. .............. 198/347.1 |
| 8,028,820 B2 * | | 10/2011 | Giehrl et al. ................ 198/594 |
| 8,365,905 B2 * | | 2/2013 | Fege ............................ 198/812 |

FOREIGN PATENT DOCUMENTS

| | | |
|---|---|---|
| DE | 68902646 T3 | 7/1997 |
| DE | 102004053663 A1 | 8/2005 |
| DE | 102008044430 A1 | 2/2010 |
| DE | 202008010177 U1 | 4/2010 |
| DE | 202008014282 U1 | 4/2010 |
| EP | 0442200 A1 | 8/1991 |
| EP | 0581143 A1 | 2/1994 |
| EP | 1161391 A1 | 12/2001 |
| EP | 1232974 A1 | 8/2002 |
| EP | 1849725 A1 | 10/2007 |
| WO | WO-2010005300 A1 | 1/2010 |
| WO | WO-2010049019 A1 | 5/2010 |

OTHER PUBLICATIONS

Search Report for DE 10 2010 040 413.6, dated Apr. 1, 2011.
Search Report for DE 10 2010 040 410.1, dated Apr. 1, 2011.
Search Report for EP 11176569.9 mailed Dec. 23, 2011.

* cited by examiner

Primary Examiner — James R Bidwell
(74) Attorney, Agent, or Firm — Marshall, Gerstein & Borun LLP

(57) ABSTRACT

A conveyor system having at least one variable capacity storage for a bottle treatment machine, at least two guides running laterally adjacent and at least one transfer guide are provided for a bottle carrier chain of curve-going coupled bottle carriers, with runs of the bottle carrier chain being transferable from one guide to the adjacent guide via the transfer guide are drivable along the guides. Each of the guides comprises at least one tension member drivable by at least one conveyor drive of the conveyor system, and a respective run of the automatically guided bottle carrier chain is arranged a certain distance along a tension member, separated there from the tension member by an air gap and is driven and guided by the respective tension member by a plurality of magnetic couplings which in the area of the transfer guide are automatically releasable and engageable.

26 Claims, 4 Drawing Sheets

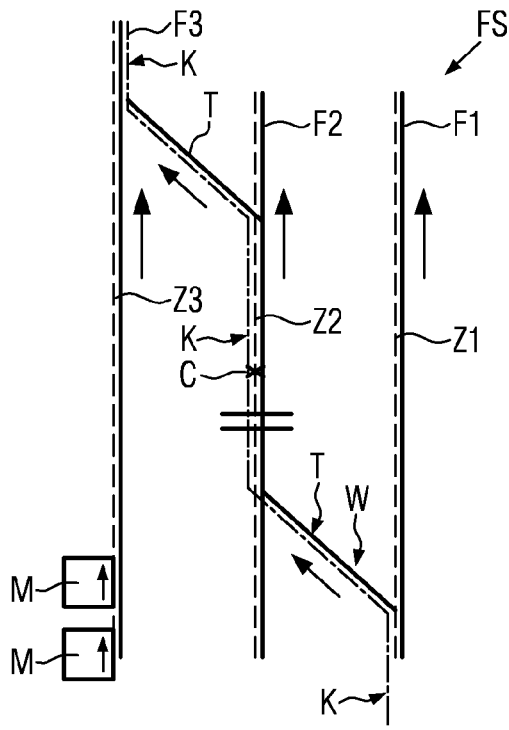
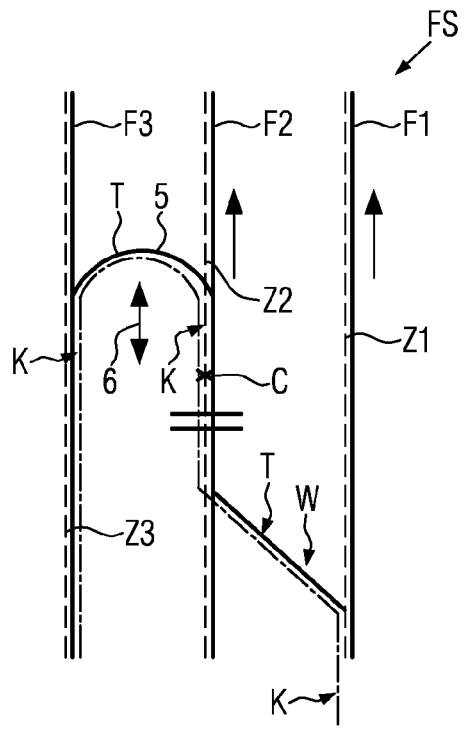
FIG. 4　　　　　　FIG. 5
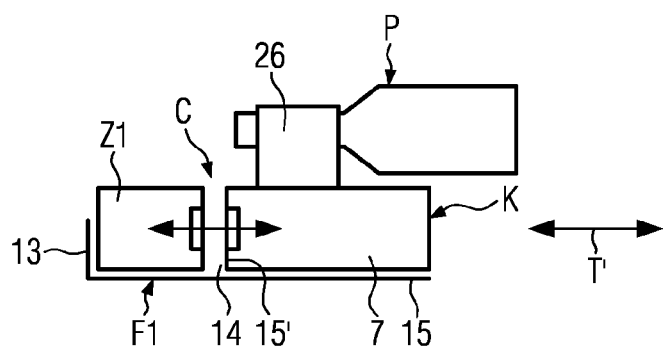
FIG. 6

CONVEYOR SYSTEM

CROSS-REFERENCE TO RELATED APPLICATION

The present application claims the benefit of priority of German Application No. 102010040410.1 filed Sep. 8, 2010 and German Application No. 102010040413.6, filed Sep. 8, 2010. The entire text of the priority application is incorporated herein by reference in its entirety.

FIELD OF THE DISCLOSURE

The disclosure relates to a conveyor system, such as used in beverage bottling operations.

BACKGROUND

In bottle treatment machines, a conveyor system is provided for transporting bottles, such as PET bottles, between various stations. In the conveyer system, multiple conveying paths can be provided, between which the bottles are to be transferred for distributing or sorting. Alternatively or additionally, a variable capacity storage can be incorporated into the conveyor system, which in the event of failure or malfunction of a station temporarily stores the bottles delivered to a station and not received at the same rate, or for a faster receiving rate supplies enough bottles, in order to create a time buffer within which ideally the malfunction is eliminated, so that the bottle treatment machine is continuously operable. In both cases, it is standard to use the bottle carrier chain simultaneously as a tension member to which the conveying movement is applied. For a change of path between different conveying paths each with a bottle chain, it is necessary to take the bottles off a bottle carrier chain and to transfer them onto the other bottle carrier chain. This requires a number of tension members and bottle carrier chains. Due to the dual task of bottle carrier chains being used as tension members, namely the load-bearing function and the driving function, such bottle carrier chains are complex, expensive and prone to damage. In the second case of a storage having the bottle carrier chain fulfilling the drive function and the load-bearing function, it is necessary during deflection to release the bottle carrier chain from a guide and insert it into another. In addition, the bottle carrier chain, fulfilling the driving movement along the guides and the load-bearing function, must be of a great length, for instance as an endless loop.

A conveyor system of a bottle treatment machine is known from DE 10 2004 053 663 A, where, in the storage formed as a storage tower, two neighboring guides are disposed in a spiral-shaped manner in which at least part of an endless loop of the bottle carrier chain is guided and driven, and to which a carriage with two reverse-image transfer guides is movably arranged in order to be able to vary the capacity of the storage as required. The bottle carrier chain is directly driven along the guides, is a special link chain, and carries plate-like bottle carriers or bottle grippers on the upper side. In the respective transfer area, the bottle carrier chain is released from the guide by mechanical means of the transfer guide, guided and deflected in the transfer guide and by mechanical means again inserted into the other guide. This results in considerable strain, so that the bottle carrier chain is very stabile and heavy duty also due to the considerable load, and relatively high driving power is required which in turn subjects the bottle carrier chain to considerable local tension stress. The bottle carrier chain also acting as tension members can, for example, also have frictionally engaged contact between the bottles, the guides and the like, leading to contamination and wear of the bottles.

A conveyor system of a cigarette processing machine is known from EP 0 581 143 B, in which either a single chain-type conveyor element is used simultaneously for initiating the drive movement and for carrying the load, or a load-bearing conveyor element is driven independently in each of two separate guides. A variable capacity storage is integrated into the conveyor system, which has at least one transfer guide for deflecting the conveyor flow from one guide onto the other guide. In the case of only a single endless conveyor element, it is in the transfer area released from a guide, transferred and re-inserted into the other guide. In the second case with the two conveyor elements drivable independently of each other in the two guides, the transfer guide is designed as a bridge-shaped conveyor element which receives the flow of cigarettes from a conveyor element, transfers it and conducts it to the other conveyor element.

A goods-conveyor system having a variable capacity storage is known from EP 1 161 391 B, in which two belt carrier chains are driven and guided in two adjacent guides which at the same time fulfill a load-bearing function. In the transfer area, a rotatable conveyor disc is moveably arranged between the guides and along them, which at the same is driven in rotation by both belt carrier chains in order to be able to receive goods, transfer and again load them onto the other belt carrier chain.

A substantially straight-lined conveyor system for the same or similar objects is known from EP 1 232 974 B, which in piece goods processing are treated in multiple processing steps. In the conveying path, a guide for a belt carrier chain is disposed, which fulfills only a load carrying and conveying function. On both sides of the guide, toothed belt drives or drive wheels are arranged there, which are driven at a desired speed of circulation corresponding to the conveying speed, and transfer this speed of circulation to the load carrier chain with which they overlap for a certain distance. Transfer of the drive speed is effected by magnetic effect in that the belt drives or the drive discs carry series of permanent magnets, and magnetized armature elements or magnets are arranged at the individual belt carriers of the belt carrier chain.

SUMMARY OF THE DISCLOSURE

The disclosure has an aspect to provide a conveyor system of the type mentioned above, which is operationally reliable, universally variably operable, and during operation subjected to only moderate forces and tensions, and for which there is no wear and no contamination of the bottles in a transfer area. The conveyor system is preferably characterized by a storage at low costs and ease of design as well as by wear-resistance and operation not prone to failure.

By separating the function of receiving and transferring the drive speed from the function of load-carrying and conveying bottles, each tension member has only a driving function without the need of assuming or supporting significant loads. Driving the tension member by means of one or several motors is possible, which preferably can be arranged closely consecutive, so that the tension force being effective in the tension member can be maintained at a low level. The tension member may therefore be designed in a relatively light and delicate manner, thus also its motion resistance is kept low and only small masses need to be moved. As the bottle carrier chain has only the load-bearing and the conveying function and conveys bottles in the transfer area as well as along the guides, it can be composed of simple bottle carriers, which are coupled to negotiate curves and transfer the carried load directly to the guide elements, without burdening the tension members therewith. The magnetic couplings allow slip-free transfer of tensile forces which are evenly distributed along the entire overlap length between the guide and the run of the bottle carrier chain, so that the bottle carrier chain as well as also each tension member is subjected to only small local tensile stress, thus being easy on the couplings between the bottle carriers and allowing for light and cost-effective design of the bottle carrier chain. In the transfer area, neither separate transfer of the bottles is required, nor do complicated switch members prone to wear need to be mechanically disengaged or engaged at the tension members, because the magnetic couplings are automatically released or engaged, respectively, when the bottle carrier chain needs to be detached from a tension member or reconnected to another tension member. The guides are mainly for guiding the driven tension members and can be designed in a simple manner. Owing to the magnetic coupling, however, proper guiding of also the bottle carrier chain is achieved along the path in which the bottle carrier chain is located at the tension member, although the bottle carrier chain and the tension member are separated by an air gap, so that no wear and also no contamination can be transmitted between the tension member and the bottle carrier chain and/or the bottles.

In an advantageous embodiment, each magnetic coupling is released and engaged by a relative movement of at least one bottle carrier relative to the tension member forced by the transfer guide. Owing to the air gap between the bottle carrier and the tension member, there is a holding and guiding force being predeterminable in a relatively exact manner and being largely constant among the magnetic couplings, which strongly diminishes digressively already after a slight relative movement or after a final relative movement is progressively achieved immediately, respectively. This means that significant forces between the transfer guide and the bottle carriers are to be transferred only at the very start and the very end of a transfer. Releasing and engaging the magnetic coupling is gentle, so that the bottles are not subjected to any significant vibrations.

The disclosure is particularly useful for a conveyor system comprising a storage, where in the storage the transfer guide can be a transfer return bend, for the bottle carrier chain then formed in an endless manner, disposed movably along the guides for the tension members. The tension members are driven along the guides in opposite directions at variable speeds, preferably independently of each other. The magnetic couplings are automatically released and engaged by having the transfer return bend acting on the bottle carrier chain in the transfer area. No mechanical aids other than the transfer return bend are required for releasing and engaging the magnet couplings. The magnetic couplings perform over long periods free of wear and without having the coupling effect diminish. Furthermore, they are in their effectiveness not susceptible to gases, radiation or liquids which are frequently used in bottle treatment machines.

In one alternative embodiment of the conveyor system, two or more than two guides are provided, each having only one tension member. At least two of the tension members are driven in the same directions and synchronously. The transfer guide is either a switch for changing paths of the bottle carrier chain between the tension members or conveying path, respectively, of the conveyor system, driven in the same direction or a transfer return bend for deflecting the bottle carrier chain between tension members driven in opposite directions and possibly at different speeds. This embodiment may cooperate with a variable capacity storage or be operated without a storage, in order to distribute or sort bottles into different conveying paths, without having to arrange a continuous bottle carrier chain in every conveying path.

Since the tension member does not have to fulfill any load-bearing function, it can be an inexpensive and simple and light link chain. The bottle carrier chain and the link chain can be provided with identical or different partitions between the links and the bottle carriers, respectively. Different partitions are possible, because the tension members always run along their guides, and only the bottle carrier chain either along the guides or through the transfer area.

In the bottle carrier chain, consecutive bottle carriers are preferably coupled in either a pivot joint or in a pivot/slide joint being pivotable or pivotable/slideable in preferably only two opposite directions. The pivot joint can have a pivot axis being essentially perpendicular to the drive direction of the tension member, which advantageously can also be perpendicular to the plane in which the transfer guide lies. As a result, the bottle carriers support each other in a stable manner when they pass through the transfer area.

In a particularly advantageous manner, each magnetic coupling comprises at least one permanent magnet and one armature element or a second permanent magnet with opposite magnetic polarization at the tension member, being magnetically attractable by the permanent magnet across the air gap and a bottle carrier. The air gap is determined by the guide elements of the tension member and the bottle carrier chain. Along the run of the bottle carrier chain overlapping the tension member in the path, there are many coupling points having essentially the same coupling forces, so that the tension force of the tension member is transferred in an evenly distributed manner.

It is advantageous to have the relative movement being forced by the transfer guide be oriented in a plane defined by the transfer guide, which is in the engagement direction of each magnetic coupling or to which it is perpendicular. In the first case, the magnetic coupling is opened by increasing the air gap, whereas in the second case, the release motion is a parallel relative wiping motion without any significant change in the width of the air gap. The holding force of the magnetic coupling in the second case decreases somewhat more harmonious than in the first case with the rapid opening due to the decreasing area overlap between the cooperating magnetic elements during the relative wiping motion. The respective engaging process is the same, but inversely.

Depending on the manner in which the bottles are transported, meaning e.g. standing, lying, hanging or the like, the path of the bottle carrier chain is guided either above or below the tension member, respectively, or laterally adjacent.

The permanent magnets or armature elements, respectively, can be formed plate-like or disc-shaped and are arranged on support surfaces which are located either on the outer side of the tension member or the bottle carrier, respectively, or sunk-in so that there are no projections.

Each bottle carrier is advantageously provided with at least one magnetic coupling. Alternatively, each bottle carrier can be provided with several magnetic couplings in case of bottle carriers being longer in the conveying direction, or some bottle carriers might even be conveyed without any magnetic coupling.

In a structurally simple manner, each bottles carrier comprises at least one bottle platform, preferably with at least one stop for a bottle, or at least one bottle gripper, depending on the desired kind of transport for the bottles.

For reasons of costs, it is advantageous to form the bottle carriers as substantially identical plastic injection molding elements. As a result, the bottle carrier chain is formed in a cost-effective and light manner, which in interaction with a delicate and light link chain as a tension member requires only relatively low driving forces despite high conveying speeds.

In an advantageous embodiment, the transfer return bend comprises as a transfer guide at least one guide element for the bottle carrier, engaging with the bottle carrier chain at the outer side of the curve, so that they are guided properly in the transfer area, because the guiding and supporting effect of the magnetic couplings are temporarily eliminated there.

The tension member is preferably driven outside of the storage or even inside it, by at least by one conveyor motor. Due to the concept of separation of functions, however, multiple consecutively arranged conveyor motors could be provided along the tension member, in order to distribute the driving forces and keep the local stresses in the tension member at a low level. Multiple conveyor motors can even be arranged closely consecutive.

In the guide, at least one frame-fixed side guide member of the tension member can simultaneously form a guide member bearing the load and adjusting the air gap for instance the underside of the bottle carrier. This dual function of side guide entails a structural simplification and ensures maintenance of the air gap.

At least in the storage, the guides of the tension members can be arranged in a curved manner. They preferably follow a spiral path or a helical path in a storage tower. The tension member is configured as a link chain and fitted with rollers either on the side facing the inside of the curve of the guide or supported there on rollers in the guide, in order to maintain the movement resistance as low as possible. However, ascension of the link chain due to the tension on the outer side of the curve can easily be prevented in that fingers on the link chain reaching under a guide member of the guide prevent ascension. One result is low vibration, low noise and steady running of the link chain even at high conveying speeds.

An advantageous embodiment is characterized in that tension chains are replaced by a continuous series of shuttles, where despite the shuttles being no longer mechanically connected to each other, they are still controlled in an integrated manner. The advantage is speed-sensitive electric control of incoming and outgoing shuttles. Selection of such a control simplifies controlling complexity. Coupling of a carrier chain to form shuttles as so-called "tension shuttles" can also be performed mechanically or magnetically or in a combination by means of a detachable connection. In the area of deflection, the carrier chain is guided similar to a so-called energy chain.

BRIEF DESCRIPTION OF THE DRAWINGS

Embodiments of the disclosure are explained with reference to the drawings. They show in.

DETAILED DESCRIPTION OF THE PREFERRED EMBODIMENT

Figure 1:
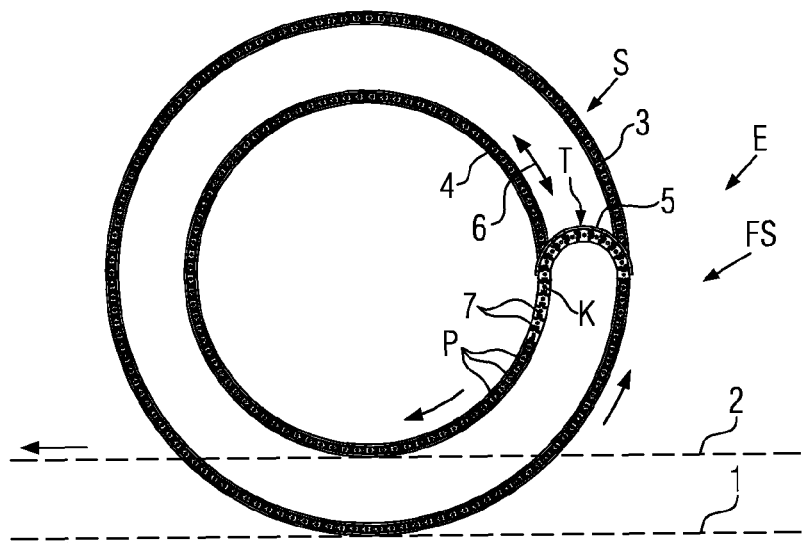
FIG. 1 in plan view and schematically a section of a conveyor system of a bottle treatment machine comprising a storage, FIG. 2 an enlarged scale plan view of a section from FIG. 1, FIG. 3 a section in the plane A-A from FIG. 2, FIG. 4 a schematic plan view of a different design of a conveyor system, FIG. 5 a schematic plan view of a further design of a conveyor system, FIG. 6 a section according to FIG. 3 of a further embodiment, FIG. 7 a top view of a embodiment as an alternative to the embodiment shown in FIG. 2, and FIG. 8 a cross section along the line VIII from FIG. 7.

FIG. 1 shows a section of a conveyor system FS, for example, of a bottle treatment machine E, where the conveyor system FS extends between stations, not shown, of the bottle treatment machine E delivering and/or treating bottles P. Part of the conveyor system FS can in accordance with FIG. 1 be formed as a storage S, for example, as a storage tower with spiral-like or double-helix-shaped conveyor paths 3, 4. For example, straight-lined conveyor paths 1, 2 deliver the bottles P, a variable number of which can be temporarily stored in the storage S. Along the respective conveying paths 1, 2, 3, 4, guides are provided, which are not marked in FIG. 1, but are explained, however, for instance with reference to FIGS. 2 and 3.

At least one transfer guide T is provided in the storage, in the illustrated embodiment, a transfer return bend 5 overlapping approximately 180°, which is movable in the direction of a double arrow 6 between the conveying paths 3, 4, in order to vary the capacity of the storage S. The bottles P are transported by means of a bottle carrier chain K (e.g. an endless chain loop) in a standing, hanging, or lying manner or any other way. The bottle carrier chain K is composed of curve-going bottle carriers 7 coupled with one another.

Figure 2:
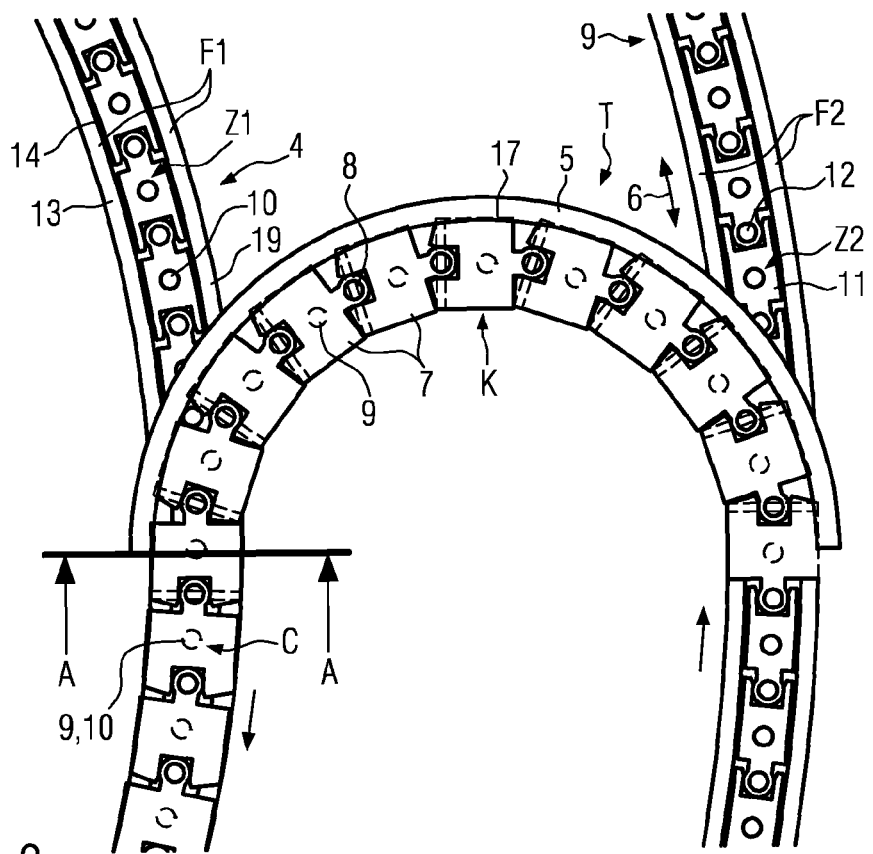
Figure 3:
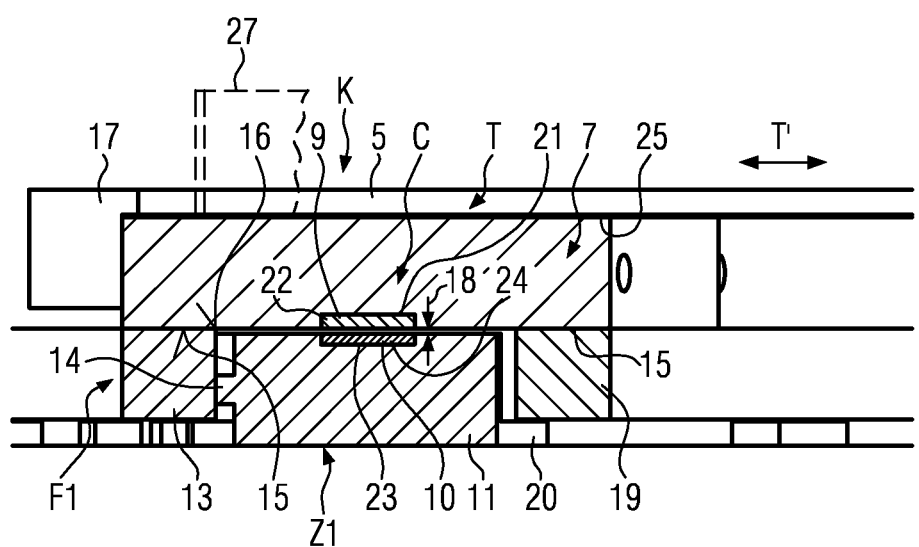

FIGS. 2 and 3 illustrate a transfer area between the conveying paths 3, 4. A first tension member Z1 is guided in a first guide F1 following a left bend. The tension member Z1 is for instance a link chain formed by curve-going links 11 coupled with one another comprising pivot joints 12, which run between inside and outside guide members 13, 19, where rollers 14 are provided on the links 11 on the inner side or the guide member 13 and plates 20 engage from below on the outer side of the curve curvature of the guide member 19, preventing the tension member Z1 from ascending under tension force. The tension member Z1 is for example driven by one or multiple conveyor motors M (FIG. 4) of the conveyor system FS possibly arranged closely consecutive, which can be disposed within the storage S or outside the storage S. The drive speed of the tension member Z1 is e.g. variable. In a second guide F2, being parallel to the first guide to F1, a second tension member Z2 is guided, which can be driven by at least one conveyor motor (not shown). The first and second guides F1, F2, run preferably over a certain conveying distance at a constant separation distance adjacent to each other in a plane T, which is parallel to the plane of the transfer guide T. The driving speeds of the two tension members Z1, Z2 may be identical or different and variable. The transfer guide T is guided movably in the direction of the double arrow 6 along the guides F1, F2, as is conventional for such storages. The directions of movement of the tension members Z1, Z2 are opposite to each other. Depending upon which speed of movement of the two tension members Z1, Z2 is higher, the transfer guide T moves along with the tension member Z that runs faster, at a relative speed of movement in dependency of the difference in speed of movement. This increases or decreases the capacity of the storage, which means, either more bottles P can be temporarily stored in the storage S than received, or more bottles P can received than supplied. If the speeds of movement of the two tension members Z1, Z2 are nominally equal, then the transfer guide T remains in place (receive rate of the bottles P equals supply rate)

In the illustrated embodiment, the bottle carriers 7 are coupled together in a curve-going manner by pivot joints 8. In an embodiment not shown, pivot/slide joints could here be provided, which likewise ensure curve mobility. The bottle carriers 7 are, for instance, injection-molded plastic elements, which in the embodiment illustrated in FIGS. 2 and 3 comprise bottle platforms 25 on the upper side, preferably with an outer stop 27 (FIG. 3) for additionally securing a standing bottle P. The links 11 of the link chain of the tension members Z1, Z2 can be injection-molded plastic elements, preferably with metal reinforcement, or can be made of metal.

Since the tension members Z1, Z2 transfer the drive speed to the load-bearing bottle carrier chain K and exert a guiding effect in the direction of movement onto the bottle carriers 7, the tension members Z1, Z2 can be delicate, relatively light and simple link chains.

The tension force or the speed of movement, respectively, of each tension member Z1 is transferred by a plurality of magnetic couplings C via an air gap 18 (FIG. 3) to the run of the bottle carrier chain K which over a certain distance extends congruently with the respective tension members Z1, Z2. Each magnetic coupling C (at least one magnetic coupling C can be provided for each bottle carrier 7) is for the illustrated embodiment, for instance, comprised by a permanent magnet 10 on a link 11 of the link chain and a permanent magnet 9 magnetically polarized oppositely, here at the underside of a bottle carrier 7. There could be only one permanent magnet 9 or 10 provided and the other magnetized component is an armature element. The permanent magnets 9, 10 are plate- or disc-shaped and mounted on supporting surfaces 21, 23. The support surfaces 21, 23 can be located on the outer sides of the links 11 or of the bottle carrier 7, respectively, or, as shown, sunk in recesses 22, 24 so that the permanent magnets 9, 10 or the respective armature element, respectively, does not protrude, even possibly recedes somewhat.

The inside and outside guide members 19, 13 for the tension member Z1 are arranged fixed to the frame. The topsides 18 of the guide members 19, 13 simultaneously form a guide track for the underside 16 of each bottle carrier 7, so that an air gap 18 is maintained between the tension member Z1 and the bottle carrier chain K, and also the magnetic components of the magnetic couplings C do not contact one another. The coupling force in each magnetic coupling C in the illustrated embodiment acts approximately perpendicular to the plane T' in which the transfer guide T deflects the bottle carrier chain K from one tension member Z1 to the other Z2. In this, each bottle carrier 7 is forced into a relative pivotal movement in the pivot joint 8 relative to the link 11 of the tension member. The pivotal movement occurs in the plane T' of the transfer guide T, where the respective magnetic coupling C is released or engaged, respectively, in a parallel wiping movement pattern.

The transfer guide T formed as a transfer return bend 5 can for transferring comprise an additional guide member 17, e.g., for the upper outer edge of each bottle carrier 7, which cooperates both in releasing as well as in engaging the magnetic coupling C and during the transfer or deflecting movement, respectively. The engaged magnetic couplings C do not only transmit the drive speed, but stabilize and guide the running bottle carrier chain A.

In the designs of conveyor systems FS suggested sectionally and schematically in FIGS. 4 and 5, at least two guides F1, F2 are provided running adjacently to another, in each of which a tension member Z1, Z2 is guided. The tension members Z1, Z2 are driven in the same direction, for instance synchronously or at different speeds. The transfer guide T is formed as an alterable or fixed switch in order to enable a change of paths for the bottle carrier chain K, driven by the respective tension member Z1 or Z2, respectively, for example for sorting or distributing streams of bottles. The bottle carrier chain K is coupled with the respective tension member F1, F2 via magnetic couplings C at a location where the runs of the bottle carrier chain K overlaps with the tension members Z1, Z2. The magnetic couplings C are automatically released and engaged, respectively, by means of the relative movement between the bottle carrier chain K and the respective tension member Z forced by the transfer guide T. If the tension members Z1, Z2 should have different speeds, then the transfer guide T can be movable along the guides F1, F2. In FIG. 4, a third guide F1 is provided for a third tension member Z3, which has the same direction of movement as the tension members Z1, Z2. Another transfer guide T (switch W) enables transferring the bottle carrier chain K also to the third tension member Z3. FIG. 4 also illustrates at least two conveyor motors M disposed consecutively, preferably closely one behind the other, for driving at least one, several, or all the tension members.

In the embodiment shown in FIG. 5, the third tension member Z3 is driven in the direction opposite to the direction of movement of the first and second tension members Z1, Z2, The nominal speed of the third tension member can be equal to the nominal driving speed of the other tension members Z1 and/or Z2, or be different therefrom and/or be variable. In this case, the transfer guide T again is the transfer return bend 5, which deflects the bottle carrier chain K e.g. over 180° and is possibly movable in the direction of the double arrow 6. In FIG. 5, the automatically releasable and engageable magnetic couplings C are provided to transfer the respective driving speed without slip to the bottle carrier chain K. In the transfer area, the bottles remain on the bottle carrier chain K while it changes the track or the conveying path, respectively. Only one bottle carrier chain K (e.g., as an endless chain) is required, and two or three or more simple tension members Z1-Z3 for driving it.

In the embodiment shown in FIG. 6, in contrast to the embodiment shown in FIG. 3, each bottle carrier 7 is arranged and guided, e.g. in a storage S, adjacent alongside the tension member Z1. The coupling force acts on the magnetic coupling C parallel to the plane T' in which the transfer guide T forces the relative movement of the bottle carrier chain K relative to the respective tension member Z1, in order to perform a transfer, to automatically release or engage the magnetic coupling by opening or closing.

The tension member Z1 is guided between the guide members 13, 14 of the guide F1 on the inner and outer side of the bend, while each bottle carrier 7 is guided on the frame-fixed guide 15 and laterally in a guide element 15', for instance, by guide rollers 14 under the coupling strength of the magnetic coupling C. In this embodiment, the bottle carrier 7 has at least one bottle gripper 26 arranged on the top side, which, for instance, holds a bottle P in a lying position.

In an alternative not shown, e.g. for suspended transport of bottles P, the bottle carrier chain K could also be disposed below the respective tension member Z1, Z2 and driven by the same and guided and supported by guide members.

The permanent magnets 9 and/or 10 are conveniently made of neodymium or other rare earths, so that they being of a small size and having a low weight have a long running life and high power density.

The bottle carrier chain of the embodiment of FIGS. 7 and 8 is again composed of curve-going bottle carriers 7 coupled to each other. The individual bottle carriers 7 are magnetically or mechanically releasable in cause-effect correlation with the links 11. The links 11 may also be referred to as a shuttle.

Figure 7:
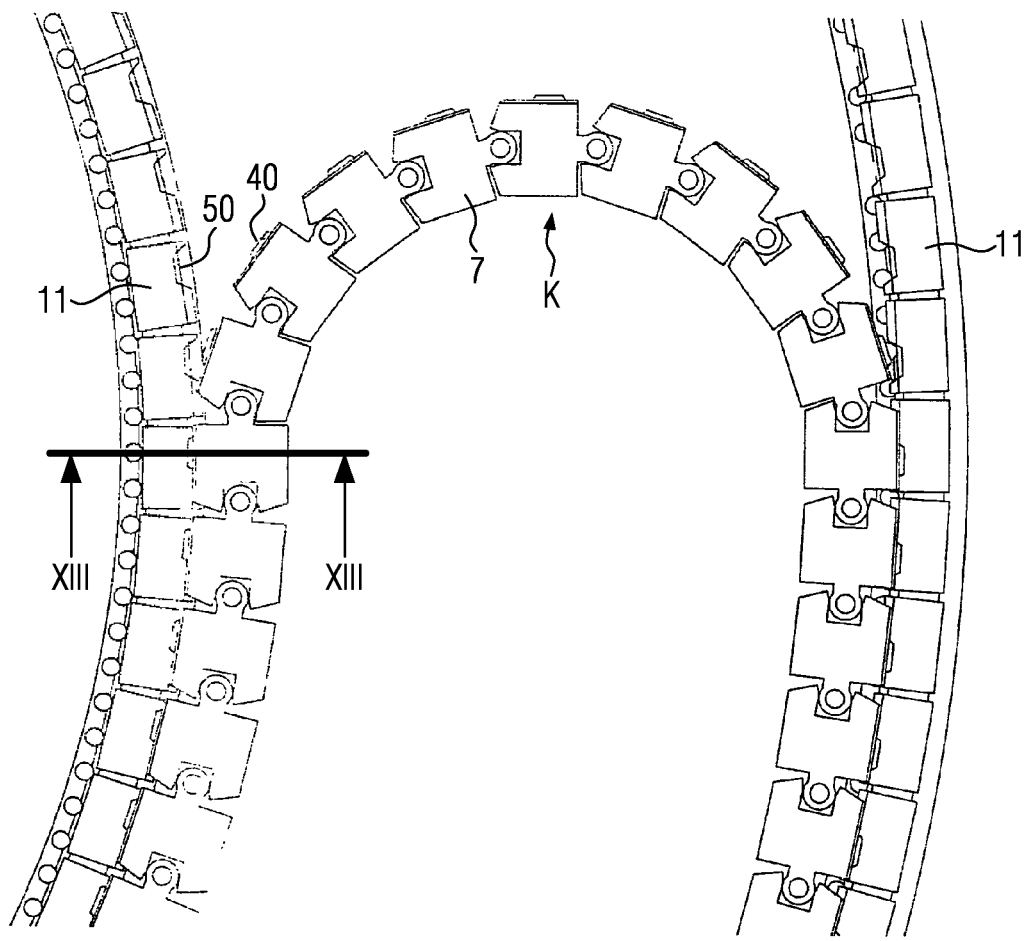
Figure 8:
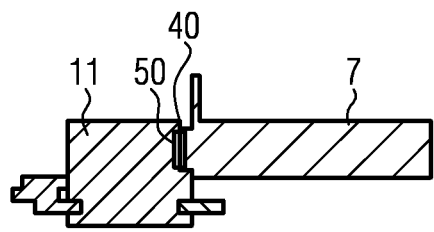

A projection 40 of the bottle carrier 7 engages in a recess 50 of a link, as is clearly seen in the embodiment of FIG. 7 and is also well recognizable in section in the embodiment of FIG. 8. A positive and/or force-fit connection of a link 11 with a bottle carrier 7 is schematically illustrated there. The connection is achieved magnetically or mechanically and designed to again be releasable.

The invention claimed is:

1. Conveyor system, comprising at least one variable capacity storage, at least two guides running laterally adjacent and at least one transfer guide for a bottle carrier chain of curve-going coupled bottle carriers, the runs of the bottle carrier chain being transferable from one guide to the adjacent guide via the transfer guide and drivable along the at least two guides, each of the at least two guides comprising a continuous tension member drivable by at least one conveyor drive of the conveyor system, and a respective run of the bottle carrier chain is guided separately a certain distance along a respective tension member and is driven by the respective tension member while separated from the respective tension member by an air gap and by means of multiple magnetic couplings, which in the area of the transfer guide are automatically releasable and engageable.

2. The conveyor system according to claim 1, wherein each magnetic coupling is releasable and engageable by a relative movement of at least one bottle carrier relative to the tension member, wherein the relative movement is forced by the transfer guide.

3. The conveyor system according to claim 1, wherein at least within the storage the transfer guide is a transfer return bend, disposed movably along the guides for the bottle carrier chain formed in an endless manner, the tension members are drivable along the guides in opposite directions at variable speeds, and the magnetic couplings are automatically releasable and engageable by the transfer return bend.

4. The conveyor system according to claim 1, wherein more than two guides are provided, each comprising one tension member, at least two tension members are driven in the same direction, and the transfer guide is a switch for changing paths of the bottle carrier chain between the tension members driven in the same direction or, when one or more tension members are driven in an opposite direction to the at least two tension members driven in the same direction, the transfer guide is a transfer return bend for deflecting the bottle carrier chain between tension members driven in opposite directions.

5. The conveyor system according to claim 1, wherein the tension member is a link chain with links.

6. The conveyor system according to claim 1, wherein consecutive bottle carriers are coupled to each other in a pivot joint or in a pivot/slide joint having a joint axis being essentially perpendicular to the drive direction of the tension member in pivotable or pivotable/slideable manner.

7. The conveyor system according to claim 1, wherein each magnetic coupling comprises at least one permanent magnet and one armature element or a second permanent magnet with opposite magnetic polarization at the tension member, being magnetically attractable by the permanent magnet across the air gap and a bottle carrier, and the air gap is determined by the guide elements of the tension member and the bottle carrier chain.

8. The conveyor system according to claim 2, wherein the relative movement is forcible in a plane being defined by the transfer guide and in that the direction of engagement of each magnetic coupling is essentially either in or perpendicular to the plane.

9. The conveyor system according to claim 1, wherein in the path, the bottle carrier chain is guided either above or below the tension member, respectively, or laterally adjacent to the tension member.

10. The conveyor system according to claim 7, wherein the permanent magnets or armature elements, respectively, are formed plate-like or disc-shaped and are arranged on outside or sunk-in support surfaces of the tension member or the bottle carriers, respectively.

11. The conveyor system according to claim 1, wherein each bottle carrier is provided with at least one magnetic coupling.

12. The conveyor system according to claim 1, wherein the bottle carrier comprises at least one bottle platform or at least one bottle gripper.

13. The conveyor system according to claim 1, wherein the bottle carriers are at least essentially identical injection-molded plastic elements.

14. The conveyor system according to claim 3, wherein the transfer return bend comprises at least one guide element for the bottle carrier engaging with the bottle carrier chain at the outer side of the bend.

15. The conveyor system according to claim 1, wherein the tension member is drivable either by one conveyor motor or simultaneously by several conveyor motors.

16. The conveyor system according to claim 1, wherein in the guide, a frame-fixed side guide member of the tension member simultaneously forms a guide member bearing the load and adjusting the air gap for the undersides of the bottle carriers.

17. The conveyor system according to claim 3, wherein at least in the storage, the guides of the tension members are arranged in a curved manner, and the tension member formed as a link chain is provided with rollers on the side facing the inside of the curve of said guide and on the side facing the outside of the curve is prevented from ascending by fingers disposed on the link chain reaching under a guide member of the guide.

18. The conveyor system according to claim 1, wherein the at least one variable capacity storage is in a communication with a bottle treatment machine.

19. The conveyor system according to claim 3, wherein the tension members are drivable along the guides independently of each other.

20. The conveyor system according to claim 4, wherein the tension members are driven at different speeds.

21. The conveyor system according to claim 5, wherein the bottle carrier chain and the link chain comprise identical partitions or different partitions.

22. The conveyor system according to claim 6, wherein the pivotable or pivotable/slideable manner of the tension member is in two opposite directions.

23. The conveyor system according to claim 12, wherein the bottle platform has at least one outside stop.

24. The conveyor system according to claim 15, wherein the tension member is drivable outside of the at least one variable capacity storage.

25. The conveyor system according to claim 15, wherein the several conveyor motors are arranged closely consecutive.

26. The conveyor system according to claim 17, wherein the guides arranged in a curved manner follow a spiral path or a helical conveyor path.

* * * * *